(12) United States Patent
Yue

(10) Patent No.: US 7,699,518 B2
(45) Date of Patent: Apr. 20, 2010

(54) PRISM SHEET AND BACKLIGHT MODULE USING THE SAME

(75) Inventor: Guo-Han Yue, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 118 days.

(21) Appl. No.: 11/309,488

(22) Filed: Aug. 11, 2006

(65) Prior Publication Data

US 2007/0206392 A1    Sep. 6, 2007

(30) Foreign Application Priority Data

Mar. 3, 2006    (CN)    .................. 2006 1 0034173

(51) Int. Cl.
*G02B 6/10*    (2006.01)
(52) U.S. Cl. .................. 362/621; 362/606; 362/613
(58) Field of Classification Search .................. 362/606, 362/611, 613, 618, 619, 620; 347/57; 359/599
See application file for complete search history.

(56) References Cited

U.S. PATENT DOCUMENTS

| | | | |
|---|---|---|---|
| 6,505,959 B2 * | 1/2003 | Masaki et al. | 362/339 |
| 6,752,505 B2 * | 6/2004 | Parker et al. | 362/627 |
| 6,799,859 B1 | 10/2004 | Ida et al. | |
| 6,827,456 B2 * | 12/2004 | Parker et al. | 362/629 |
| 7,220,026 B2 * | 5/2007 | Ko et al. | 362/339 |
| 7,232,250 B2 * | 6/2007 | Chuang | 362/620 |
| 7,320,538 B2 * | 1/2008 | Ko et al. | 362/606 |
| 2004/0114346 A1 | 6/2004 | Parker et al. | |
| 2006/0072342 A1 * | 4/2006 | Kim et al. | 362/620 |

FOREIGN PATENT DOCUMENTS

WO    WO 94/06051    3/1994

* cited by examiner

*Primary Examiner*—Sandra L O'Shea
*Assistant Examiner*—Leah S Lovell
(74) *Attorney, Agent, or Firm*—Clifford O. Chi

(57) ABSTRACT

A prism sheet includes a main body. The main body includes an incident surface, an emitting surface opposite to the incident surface, and a plurality of micro-protrusions formed on the incident surface. Each micro-protrusion includes two side surfaces and an arced ridge of intersection of the two side surfaces. Each side surface is a conical surface of an imaginary cone. The imaginary cone has a conical base whose circumference is defined by the arced ridge. The conical bases defined by the arced ridges of the micro-protrusions are parallel to each other. The present prism sheet and the backlight module using the same can efficiently decrease interference.

19 Claims, 5 Drawing Sheets

PRISM SHEET AND BACKLIGHT MODULE USING THE SAME

FIELD OF THE INVENTION

The present invention relates to optical sheets, more particularly, to a prism sheet and backlight module using the same for use in, for example, a liquid crystal display (LCD).

DISCUSSION OF THE RELATED ART

In a liquid crystal display device, a liquid crystal is a substance that does not itself radiate light. Instead, the liquid crystal relies on light received from a light source, thereby displaying images and data. In the case of a typical liquid crystal display device, a backlight module powered by electricity supplies the needed light.

FIG. 5 represents a typical backlight module 10. The backlight module 10 includes a prism sheet 11, a cold cathode fluorescent lamp 12, a reflective sheet 13 and a light guide plate 14. The light guide plate 14 is a rectangular sheet, or alternatively may be generally cuneiform. The light guide plate 14 includes a light input surface 142 located at a side thereof and a light output surface 144 adjoining the light input surface 142. The cold cathode fluorescent lamp 12 is positioned adjacent to the light input surface 142 of the light guide plate 14. The reflective sheet 13 is positioned underneath the light guide plate 14. The prism sheet 11 is positioned above the light output surface 144 of the light guide plate 14. The prism sheet 11 includes a prism surface 113 facing the light output surface 144 and a planar surface 115 on the opposite side of the prism surface 113. The prism surface 113 has a great number of rows of prism elements 1131. The rows of prism elements 1131 are provided substantially parallel to the light input surface 142 of the light guide plate 14. Each prism element 1131 is a V-shaped protrusion.

When the backlight module 10 is in use, light rays from the cold cathode fluorescent lamp 12 pass through the light input surface 142 and enter the light guide plate 11. The light rays are reflected and refracted by the light guide plate 14 before surface light rays are outputted from the light output surface 144. Afterwards, the light rays from the light output surface 144 are condensed by the prism elements 1131 of the prism sheet 11 to increase the backlight module 110's luminance. However, it is prone to occur interference on the prism sheet 11 due to the prism elements 1131 being aligned on the prism sheet 11 regularly. In order to decrease the occurrence of interference, the prism sheet 11 needs to add a light diffusion film 116 on the planar surface 115 thereof. However, a part of the light energy would have been consumed in the light rays' diffusing process, thus an optical brightness of the backlight module 10 is decreased. In addition, the light diffusion film 116 costs much in manufacturing the prism sheet 10.

What is needed, therefore, is a prism sheet and a backlight module using the same that overcome the above mentioned shortcomings.

SUMMARY

A prism sheet according to a preferred embodiment includes a main body. The main body includes an incident surface, an emitting surface at the opposite side of the incident surface, and a plurality of micro-protrusions formed on the incident surface. Each micro-protrusion includes two side surfaces and an arced ridge of intersection of the two side surfaces. Each side surface is a conical surface of an imaginary cone. The imaginary cone has a conical base whose circumference is defined by the arced ridge. The conical bases defined by the arced ridges of the micro-protrusions are parallel to each other.

A backlight module according to a preferred embodiment includes a light guide plate, a light source, and a prism sheet. The same prism sheet as described in the previous paragraph is employed in this embodiment. The light guide plate has a light input surface and a light output surface adjoining the light input surface. The light source is disposed adjacent to the light input surface of the light guide plate. The prism sheet is disposed above the light output surface of the light guide plate, an incident surface of the prism sheet facing the light out put surface of the light guide plate.

Other advantages and novel features will become more apparent from the following detailed description of the preferred embodiments, when taken in conjunction with the accompanying drawings.

BRIEF DESCRIPTION OF THE DRAWINGS

Many aspects of the present prism sheet and backlight module using the same can be better understood with reference to the following drawings. The components in the drawings are not necessarily drawn to scale, the emphasis instead being placed upon clearly illustrating the principles of the present prism sheet and backlight module using the same. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present backlight module, in detail.

Figure 1:
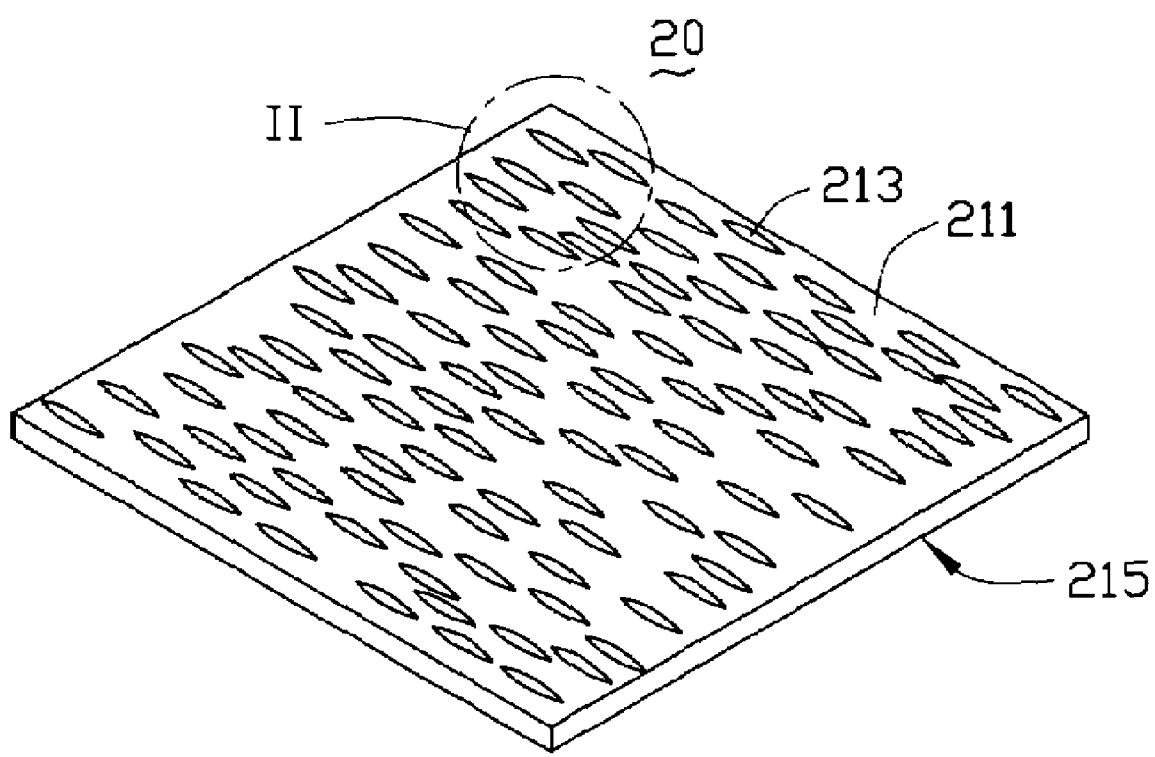
FIG. 1 is a schematic, isometric view of a prism sheet according to a preferred embodiment.

Referring to FIG. 1, a prism sheet 20 in accordance with a first preferred embodiment is shown. The prism sheet 20 includes a rectangular main body. The main body includes an incident surface 211, an emitting surface 215 positioned opposite to the incident surface 211, and a plurality of micro-protrusions 213 formed on the incident surface 211. The emitting surface 215 is a planar surface.

Figure 2:
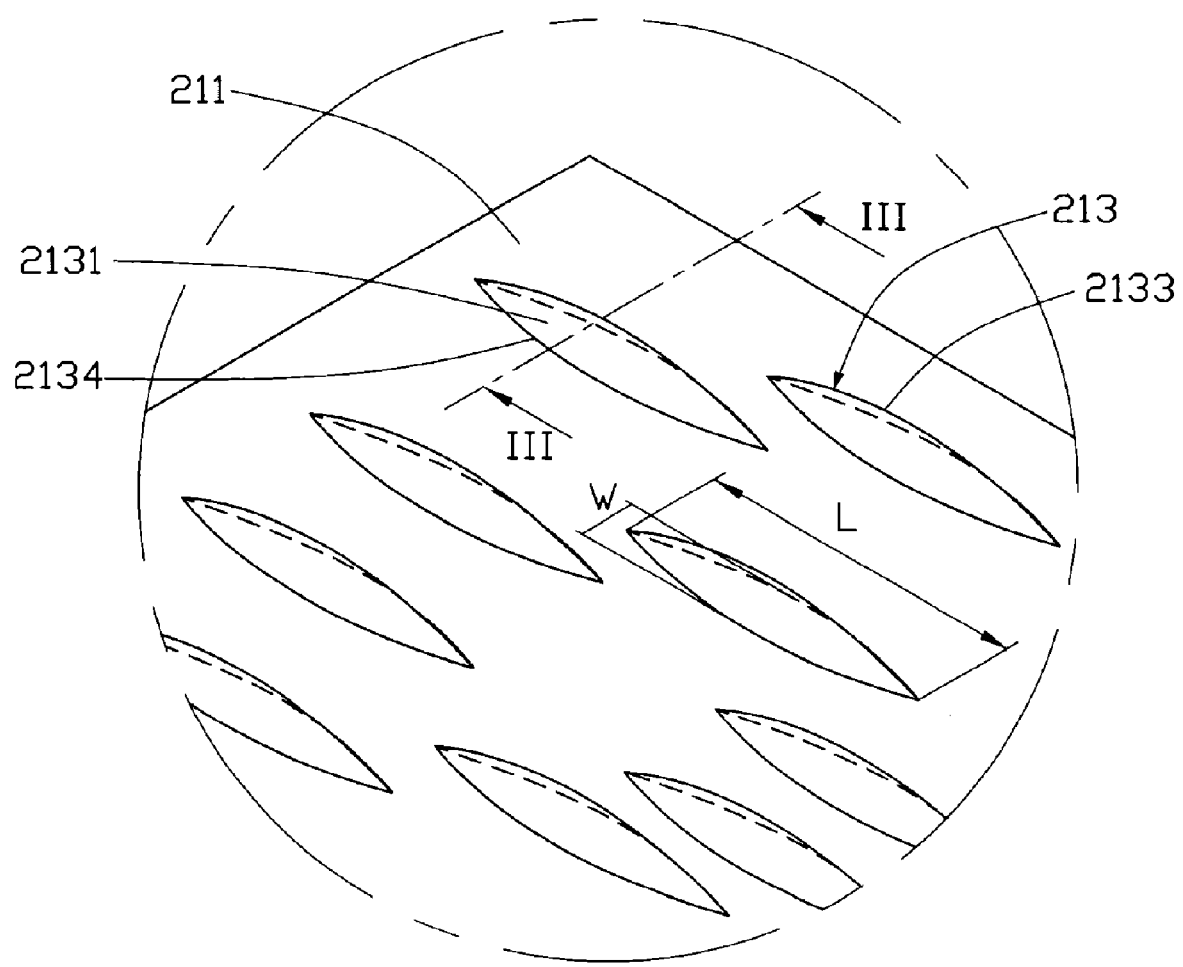
FIG. 2 is an enlarged view of a circle portion II shown in FIG. 1.

Referring to FIG. 2, each micro-protrusion 213 includes two intersecting side surfaces 2131 extending out from the incident surface 211 forming an arced ridge 2133. In each micro-protrusion 213, two ends of the arced ridge 2133 intersect with the incident surface 211, and an arced base 2134 is defined where each of the side surfaces 2131 intersects with the incident surface 211. An outline of the arced bases 2134 of the micro-protrusion forms a double pointed elliptical blade. The micro-protrusions 213 are distributed on the incident surface 211 in a random manner with the arced ridges of each micro-protrusions 213 running parallel to each other.

Figure 3:
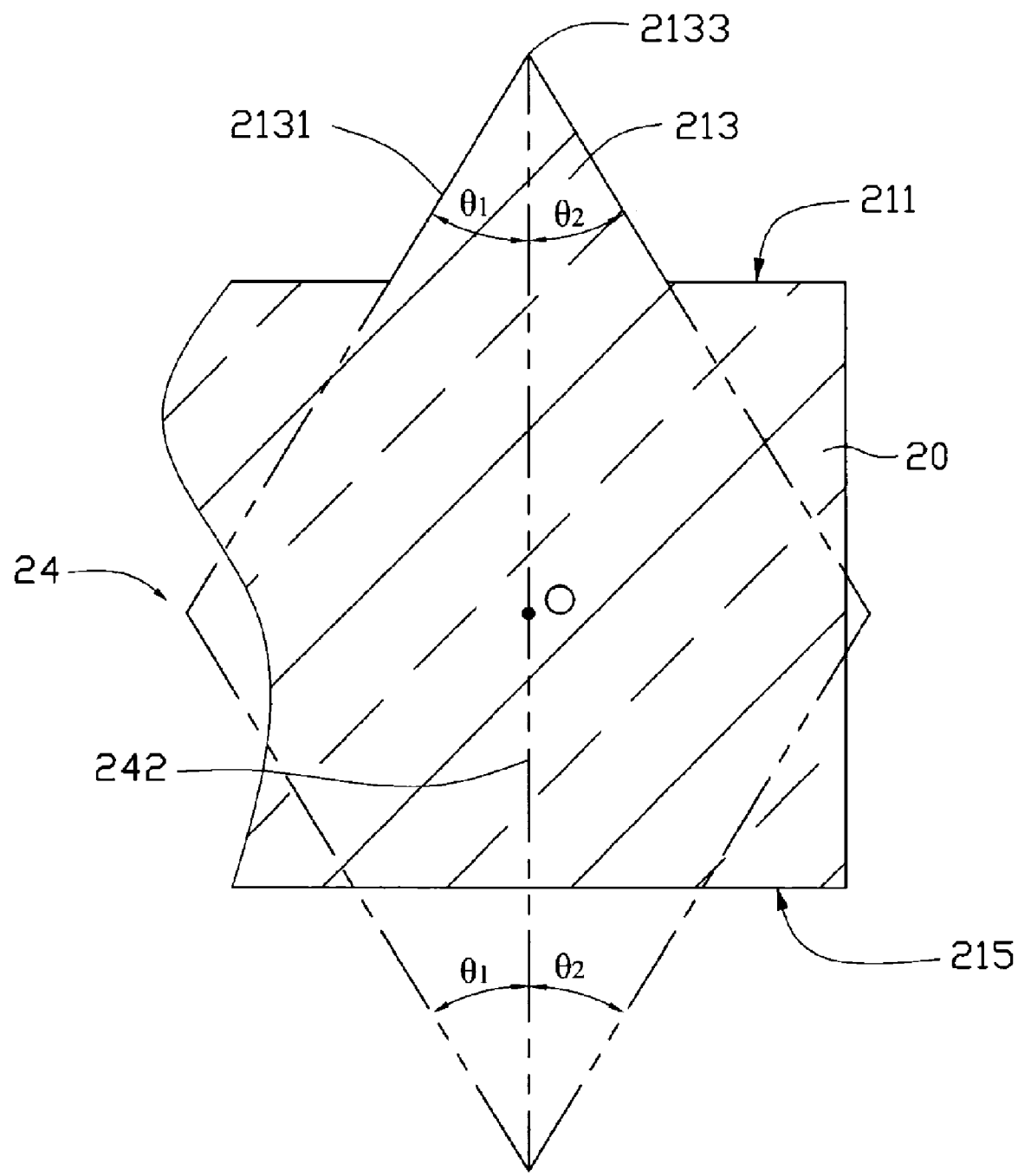
FIG. 3 is a schematic, cross-sectional view taken along a III-III line of FIG. 2.

Referring to FIG. 3, each side surface 2131 is a conical surface of an imaginary cone 24. The imaginary cone 24 has a conical base 242 whose circumference is confined by/forming the arced ridge 2133 of the micro-protrusion 213. It is also said that the each conical base 242 lies on the imaginary plane that is defined by the arced ridge 2133. O represents a center of the conical base 242 in FIG. 3. In this embodiment, the imaginary plane defined by the arced ridge 2133 of each micro-protrusion 213 is perpendicular to the incident surface 211. The two side surfaces 2131 of each micro-protrusion 213 are symmetrical with respect to the imaginary plane defined by the arced ridge 2133 of each micro-protrusion 213. Cone angles θ1 and θ2 defined by the two side surfaces 2131 with respect to the imaginary plane defined by the arced ridge 2133 are both configured to be 30 degrees. The cone angle θ1 or θ2 is not limited to a specific angle, however, it is preferably configured to be in the range of about 25 degrees to about 35 degrees.

As shown in FIG. 2, a distance between the two ends of the arced ridge 2133 that intersect with the incident surface 211 represents a length L of each micro-protrusion 213. A greatest possible distance between the arced bases 2134 of the micro-protrusion 213 measured perpendicular to the length L of the micro-protrusion 213 (i.e., between a highest point on each of the conical surface of the imaginary cone 24 relative to the conical base 242 that lies on the plane of the incident surface 211 forming a point on the arced base 2134) represents a width W of each micro-protrusion 213. The length L is configured to be in a range from about 0.1 millimeters to about 2 millimeters. The width W is configured to be in a range from about 0.001 millimeters to about 0.1 millimeters.

In an exemplary embodiment, the two side surfaces 2131 of each micro-protrusion 213 may also be configured to be asymmetrical with respect to the imaginary plane defined by the arced ridge 2133 of each micro-protrusion 213. Accordingly, the cone angles θ1 and θ2 defined by the two side surfaces 2131 with respect to the imaginary plane defined by the arced ridge 2133 are different. In another exemplary embodiment, the imaginary plane defined by the arced ridge 2133 of each micro-protrusion 213 may be configured to slant to the incident surface 211. It is noted that the whole micro-protrusions of the present prism sheet may not only be configured to be the same size and/or same shape, but may also be configured to be dissimilar size and/or dissimilar shape.

By the selective choice of the cone angles θ1 and θ2, the length L and the width W of each micro-protrusion 213, the optical performance of the prism sheet 20 such as optical uniformity and optical brightness, can be controlled. In addition, because the micro-protrusions 213 of the prism sheet 20 is configured to be a conical structure and/or the micro-protrusions 213 are distributed on the prism sheet 20 in a random manner, the occurrence of optical interference of the prism sheet 20 is efficiently decreased.

Figure 4:
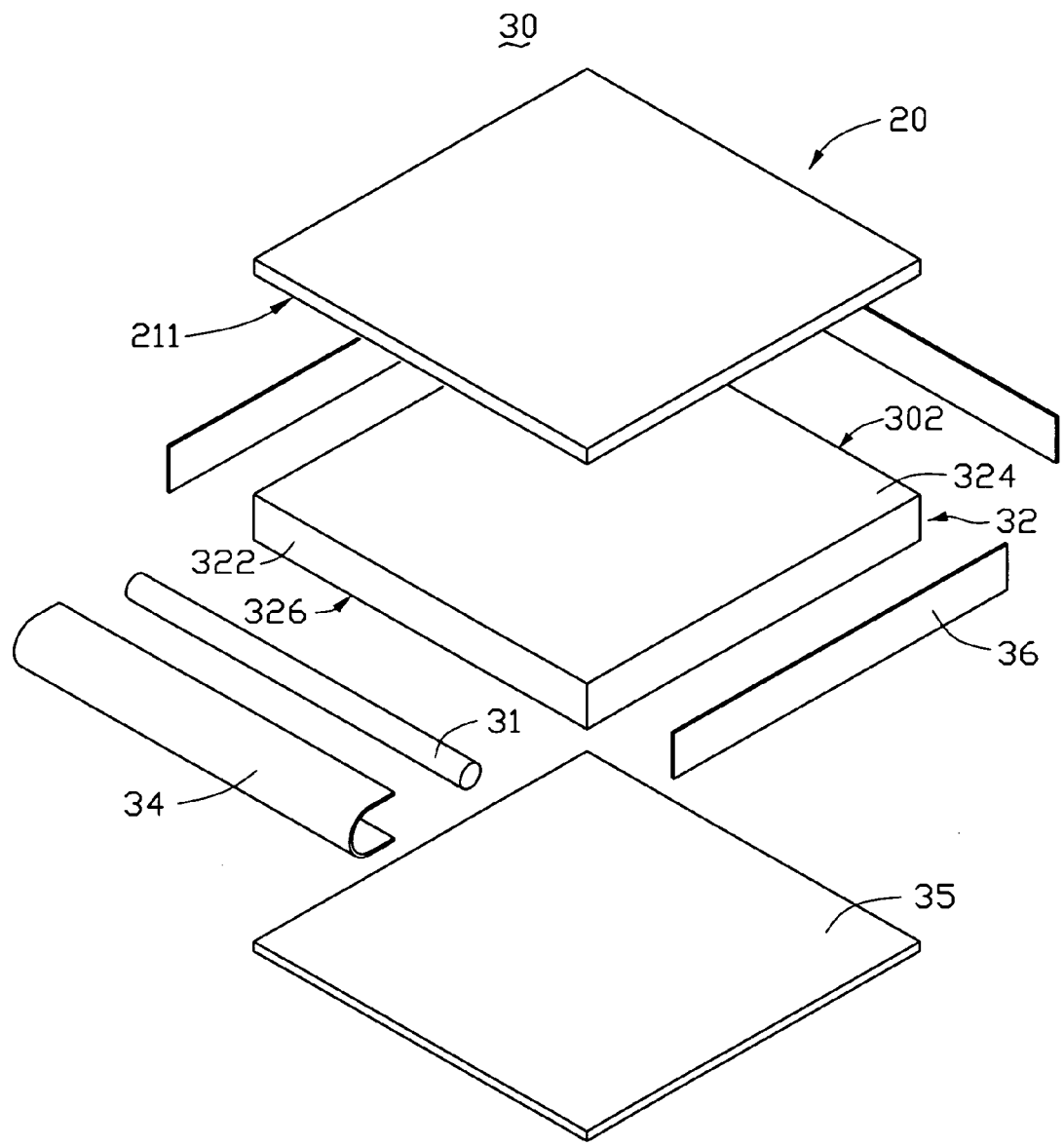
FIG. 4 is a schematic, exploded isometric view of a backlight module according to a preferred embodiment.
Figure 5:
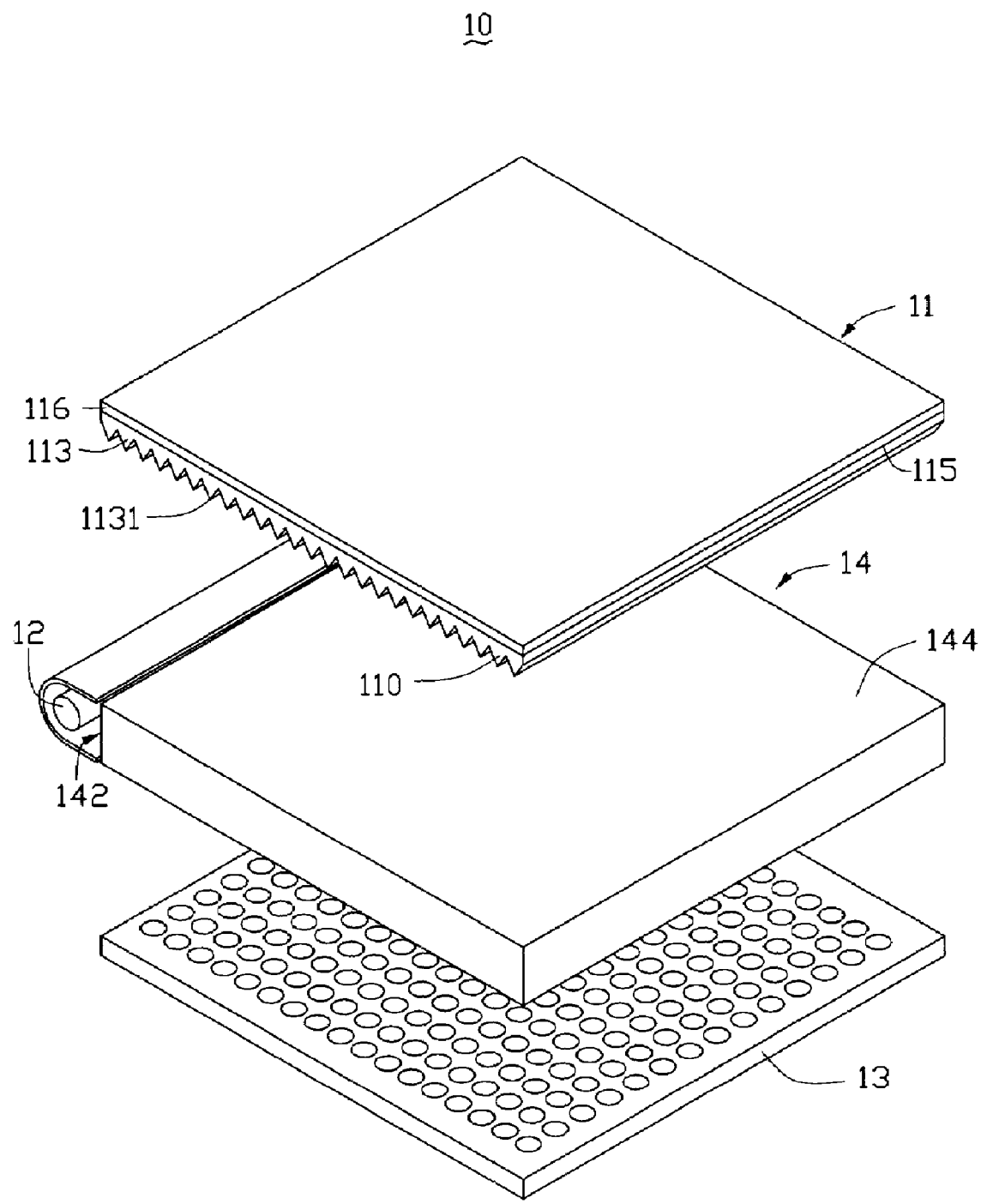
FIG. 5 is a schematic, exploded isometric view of a conventional backlight module.

Referring to FIG. 4, a backlight module 30 using the present prism sheet in accordance with a preferred embodiment is shown. The backlight module 30 includes at least a light source 31, a light guide plate 32, and a prism sheet 20. The light guide plate 32 is generally a flat sheet, which includes a light output surface 324 and a bottom surface 326 on opposite sides thereof, and further includes a light input surface 322 adjoining the light output surface 324 and the bottom surface 326, and a plurality of other side surfaces adjoining the light output surface 324 and the bottom surface 326. It is to be understood that the light guide plate 32 can be selected from any conventional light guide plates.

The light source 301, such as a cold cathode fluorescent lamp or a light emitting diode, is disposed adjacent the light input surface 322 of the light guide plate 32. The prism sheet 20 is positioned on the light output surface 324 of the light guide plate 32 having the incident surface 211 of the prism sheet 20 facing the light output surface 324 of the light guide plate 32. The prism sheet 20 is configured for condensing some light rays from the light output surface 324 of the light guide plate 32 to increase the backlight module 30's optical brightness. Because the micro-protrusions (not shown in FIG. 4) of the prism sheet 20 is configured to be a cone-surface structure and/or the micro-protrusions are distributed on the prism sheet 20 in a random manner, the occurrence of optical interference of the prism sheet 20 is efficiently decreased.

In order to improve light energy utilization rate, the backlight module 30 may further include a reflector 34, a reflective plate 35 and a plurality of side reflective plate 36. The reflector 34 is disposed adjacent to the light source 31 and partly surrounds the light source 31. The reflective plate 35 is disposed under the light guide plate 32. The side reflective plate 36 is positioned adjacent to the side surfaces of light guide plate 32 correspondingly.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A prism sheet comprising:
a main body having:
an incident surface and a substantially flat emitting surface at opposite sides thereof, and
a plurality of micro-protrusions formed on the incident surface, each micro-protrusion having two side surfaces and an arced ridge of intersection of the two side surfaces, each side surface being a conical surface portion of an imaginary cone, the imaginary cone having a conical base whose circumference is defined by the arced ridge, and the conical bases defined by the arced ridges of the micro-protrusions being parallel to each other, wherein the arced ridge has a constant radius of curvature.

2. The prism sheet according to claim 1, wherein the micro-protrusions are aligned on the incident surface in a random manner.

3. The prism sheet according to claim 1, wherein each conical base defined by each arced ridge is perpendicular to the incident surface.

4. The prism sheet according to claim 1, wherein the two side surfaces of each micro-protrusion are symmetrical with respect to the conical base defined by the arced ridge of each micro-protrusion.

5. The prism sheet according to claim 1, wherein the two side surfaces of each micro-protrusion are asymmetrical with respect to the conical base defined by the arced ridge of each micro-protrusion.

6. The prism sheet according to claim 1, wherein a cone angle defined by each side surface with respect to the conical base defined by the arced ridge is in a range from about 25 degrees to about 35 degrees.

7. The prism sheet according to claim 1, wherein a length of each micro-protrusion is in a range from about 0.1 millimeters to about 2 millimeters.

8. The prism sheet according to claim 1, wherein a width of each micro-protrusion is in a range from about 0.001 millimeters to about 0.1 millimeters.

9. The prism sheet according to claim 1, wherein light incident on the incident surface subsequently enters the main body.

10. A backlight module comprising:

a light guide plate having a light input surface and a light output surface adjoining the light input surface;

a light source disposed adjacent to the light input surface of the light guide plate; and a prism sheet disposed above the light output surface of the light guide plate, the prism sheet having an incident surface facing the light output surface, a substantially flat emitting surface facing away from the light output surface, and a plurality of micro-protrusions formed on the incident surface, each micro-protrusion having two side surfaces and an arced ridge of intersection of the two side surfaces, each side surface being a conical surface portion of an imaginary cone, the imaginary cone having a conical base whose circumference is defined by the arced ridge, and the conical bases defined by the arced ridges of the micro-protrusions being parallel to each other, wherein the arced ridge has a constant radius of curvature.

11. The backlight module according to claim 10, wherein the micro-protrusions are aligned on the incident surface in a random manner.

12. The backlight module according to claim 10, wherein each conical base defined by each arced ridge is perpendicular to the incident surface.

13. The backlight module according to claim 10, wherein the two side surfaces of each micro-protrusion are symmetrical with respect to the conical base defined by the arced ridge of each micro-protrusion.

14. The backlight module according to claim 10, wherein the two side surfaces of each micro-protrusion are asymmetrical with respect to the conical base defined by the arced ridge of each micro-protrusion.

15. The backlight module according to claim 10, further comprising a reflector disposed adjacent to the light source and partly surrounding the light source.

16. The backlight module according to claim 10, further comprising a reflective plate disposed under the light guide plate.

17. The backlight module according to claim 10, wherein the light guide plate further comprises a plurality of other side surfaces adjoining the light output surface and the bottom surface, and the backlight module further comprises a plurality of side reflective plates positioned adjacent to the side surfaces of light guide plate correspondingly.

18. The backlight module according to claim 10, wherein the light source is selected from one of a cold cathode fluorescent lamp or a light emitting diode.

19. The backlight module according to claim 10, wherein light incident on the incident surface of the prism sheet subsequently enters a main body of the prism sheet.

* * * * *